(12) United States Patent
Biradar et al.

(10) Patent No.: US 11,960,865 B2
(45) Date of Patent: Apr. 16, 2024

(54) INDUSTRIAL ANALYTICS DATA PROCESSING

(71) Applicant: Baker Hughes Holdings LLC, Houston, TX (US)

(72) Inventors: Uday Biradar, Mumbai (IN); Karan Sonawane, Thane (IN); Shreyas Lele, Mumbai (IN); Laukik Ragji, Mumbai (IN); Rohit Uplekar, Mumbai (IN)

(73) Assignee: Baker Hughes Holdings LLC, Houston, TX (US)

( * ) Notice: Subject to any disclaimer, the term of this patent is extended or adjusted under 35 U.S.C. 154(b) by 104 days.

(21) Appl. No.: 17/459,501

(22) Filed: Aug. 27, 2021

(65) Prior Publication Data
US 2023/0068353 A1 Mar. 2, 2023

(51) Int. Cl.
*G06F 8/41* (2018.01)
*G06F 8/60* (2018.01)
*G06F 8/70* (2018.01)

(52) U.S. Cl.
CPC ............... *G06F 8/41* (2013.01); *G06F 8/447* (2013.01); *G06F 8/60* (2013.01); *G06F 8/70* (2013.01)

(58) Field of Classification Search
None
See application file for complete search history.

(56) References Cited

U.S. PATENT DOCUMENTS

| | | | | |
|---|---|---|---|---|
| 2012/0203747 A1* | 8/2012 | Douetteau | ............. | G06F 16/951 707/696 |
| 2013/0346466 A1* | 12/2013 | Zhang | .................... | G06F 16/35 709/201 |
| 2015/0227392 A1* | 8/2015 | Fuller | ................... | G06F 9/4881 718/104 |
| 2018/0330277 A1* | 11/2018 | Ho | ......................... | G06N 5/022 |

\* cited by examiner

*Primary Examiner* — Lewis A Bullock, Jr.
*Assistant Examiner* — Mark A Gooray
(74) *Attorney, Agent, or Firm* — Mintz, Levin, Cohn, Ferris, Glovsky and Popeo, P.C.

(57) ABSTRACT

The method includes receiving data characterizing a first segregator code, a first aggregator code and a plurality of configuration parameters associated with a data transmission system. The data transmission system is configured to receive operation data characterizing an operation of an industrial system and transmit a portion of the operation data to a first analytical model. The method also includes modifying the first segregator code and the first aggregator code based on one or more configuration parameters of the plurality of configuration parameters. The method further includes deploying the first segregator code and the first aggregator code in the data transmission system. The first segregator code is configured to provide a first portion of the operation data to the first analytical model via a first data transmission route that includes the first segregator code and the first aggregator code.

20 Claims, 3 Drawing Sheets

100

RECEIVING DATA CHARACTERIZING A FIRST SEGREGATOR CODE, A FIRST AGGREGATOR CODE AND A PLURALITY OF CONFIGURATION PARAMETERS ASSOCIATED WITH THE DATA TRANSMISSION SYSTEM, WHEREIN THE DATA TRANSMISSION SYSTEM IS CONFIGURED TO RECEIVE OPERATION DATA CHARACTERIZING AN OPERATION OF AN INDUSTRIAL SYSTEM AND TRANSMIT A PORTION OF THE OPERATION DATA TO A FIRST ANALYTICAL MODEL — 102

MODIFYING THE FIRST SEGREGATOR CODE AND THE FIRST AGGREGATOR CODE BASED ON ONE OR MORE CONFIGURATION PARAMETERS OF THE PLURALITY OF CONFIGURATION PARAMETERS — 104

DEPLOYING THE FIRST SEGREGATOR CODE AND THE FIRST AGGREGATOR CODE IN THE DATA TRANSMISSION SYSTEM, WHEREIN THE FIRST SEGREGATOR CODE IS CONFIGURED TO PROVIDE A FIRST PORTION OF THE OPERATION DATA TO THE FIRST ANALYTICAL MODEL VIA A FIRST DATA TRANSMISSION ROUTE THAT INCLUDES THE FIRST SEGREGATOR CODE AND THE FIRST AGGREGATOR CODE — 106

FIG. 1

INDUSTRIAL ANALYTICS DATA PROCESSING

BACKGROUND

Analytics-as-a-service (AaaS) can provide tools (e.g., data analytics software) that can allow for organizing, analyzing and presenting data. AaaS can operate in a distributed computing system (e.g., a cloud) that can include multiple servers (e.g., in data centers distributed over multiple locations). In some implementations, AaaS can provide end-to-end capabilities to its customer (e.g., a company) that can include data acquisition, data analysis and data visualization (e.g., visualization of results of the data analysis).

SUMMARY

Various aspects of the disclosed subject matter may provide one or more of the following capabilities.

The method includes receiving data characterizing a first segregator code, a first aggregator code and a plurality of configuration parameters associated with a data transmission system. The data transmission system is configured to receive operation data characterizing an operation of an industrial system and transmit a portion of the operation data to a first analytical model. The method also includes modifying the first segregator code and the first aggregator code based on one or more configuration parameters of the plurality of configuration parameters. The method further includes deploying the first segregator code and the first aggregator code in the data transmission system. The first segregator code is configured to provide a first portion of the operation data to the first analytical model via a first data transmission route that includes the first segregator code and the first aggregator code.

One or more of the following features can be included in any feasible combination.

In some implementations, modifying the first segregator code includes configuring the first segregator code to generate a plurality of data subsets from the received operation data. Each data subset of the plurality of data subsets is smaller than a first predetermined data size. Modifying the first segregator code further includes configuring the first segregator code to assign a first identifier to a first set of data subsets of the plurality of data subsets. The first identifier is indicative of the first analytical model configured to receive the first portion of the operation data that includes the first set of data subsets. The plurality of configuration parameters includes the first predetermined data size and the first identifier.

In some implementations, the method further includes receiving, by a data router, the plurality of data subsets generated by the first segregator code, and identifying, by the data router, the first set of data subsets based on the first identifier. The method also includes receiving, by a first queue, the first set of data subsets and transmitting at least a portion of the first set of data subsets to the first aggregator. The first data transmission route further includes the data router and the first queue.

In some implementations, modifying the first aggregator code includes configuring the first aggregator code to identify that the first queue has received new data subsets, and combine two or more data subsets of the first set of data subsets based on a second predetermined data size associated with the first analytical model. The plurality of configuration parameters includes the second predetermined data size.

In some implementations, modifying the first segregator code further includes configuring the first segregator code to assign a second identifier to a second set of data subsets of the plurality of data subsets. The second identifier is indicative of a second analytical model configured to receive a second portion of the operation data that includes the second set of data subsets. The plurality of configuration parameters includes the second identifier.

In some implementations, the method further includes receiving a second aggregator code, and modifying the second aggregator code by at least configuring the second aggregator code to combine two or more data subsets of the second set of data subsets based on a third predetermined data size associated with the second analytical model. The plurality of configuration parameters include the second predetermined data size. The method also includes deploying the second aggregator code in the data transmission system and providing a second portion of the operation data to the second analytical model via a second data transmission route that includes the first segregator code and the second aggregator code.

In some implementations, the method further includes deploying a second copy of the first segregator code, and providing a third portion of the operation data to the first analytical model via a third data transmission route that includes the second copy of the first segregator code and the first aggregator code. In some implementations, deploying the first segregator code and the first aggregator code includes replacing an existing segregator code with the first segregator code and replacing an existing aggregator code with the first aggregator code. In some implementations, the first segregator code and the first aggregator code include machine-readable instructions configured to be executed by at least one programmable processor.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

These and other capabilities of the disclosed subject matter will be more fully understood after a review of the following figures, detailed description, and claims.

BRIEF DESCRIPTION OF THE FIGURES

These and other features will be more readily understood from the following detailed description taken in conjunction with the accompanying drawings, in which:

FIG. 1 is a flow chart of an exemplary method for configuring a data transmission system to transmit industrial data to one or more analytical models.

DETAILED DESCRIPTION

Figure 2:
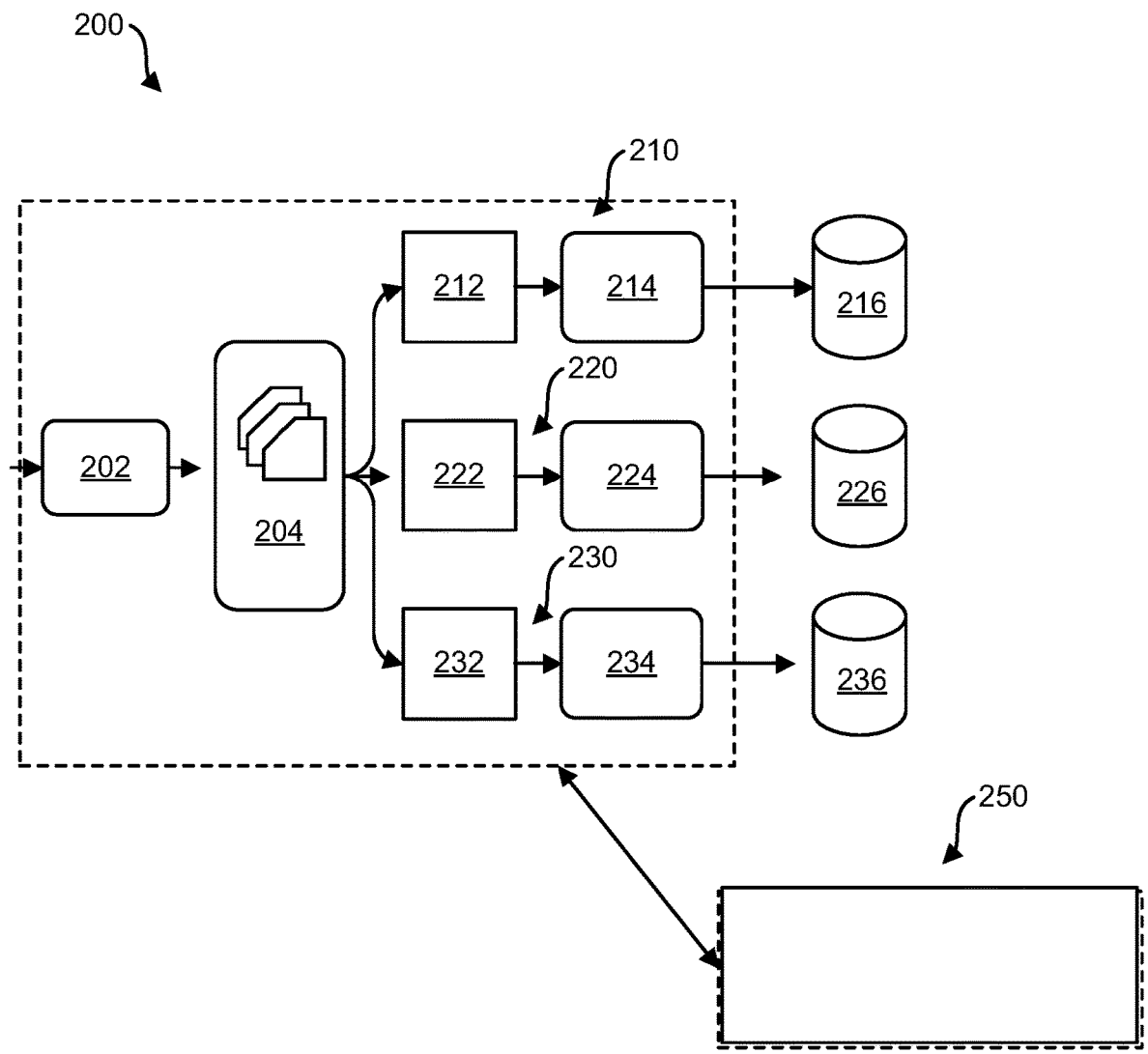
FIG. 2 illustrates an exemplary framework of the data transmission system in FIG. 1 that can be reconfigured by a reconfiguration system.

Industrial analytics can be used to model physical systems (e.g., oil and gas industrial systems) and assess their current operations and/or predict their future operation. In some implementations, multiple analytical models can be deployed to assess and analyze data from an industrial system. Typically an industrial system can generate a large dataset (e.g., operational dataset) and it may not be feasible to transfer the entire dataset to each analytical model (or a database associated with the analytical model). Furthermore, an analytical model would have to sift through the dataset, and retrieve relevant portions of the dataset for its operation. For example, a temperature anomaly detection model would need to identify and retrieve temperature data from the dataset.

A data communication system can receive data from the industrial system, and process and transmit the industrial data (or portion thereof) to one or more analytical models (or databases associated with the analytical model). In some implementations, the data communication system can include a data segregator that can receive the industrial dataset and divide the industrial dataset into multiple data subsets and assign identifiers to the data subsets. The data communication system can include a data router that can select the data subsets having a given identifier type and can transmit the selected data subsets to an analytical model via a given data transmission route. In some implementations, the data communication system can include a data aggregator that can receive the data subsets transmitted along a data communication channel (e.g., via a data queue) and modify the data subsets prior to processing by an analytical model. This can include, for example, combining two or more data subsets to create a modified data subset.

Existing data communication systems are not easily reconfigurable. For example, it can be challenging to reconfigure a data communication system that is configured for an industrial system, and/or reconfigure a data communication system designed for a first industrial system to transmit data for a second industrial system. For example, different components of the data communication system (e.g., data segregator, data aggregator, etc.) may need to be manually reconfigured. This may not be desirable as it can serve as a bottle-neck in the processing of industrial data that may need to be processed quickly. For example, sensor data may need be quickly processed to determine if an alarm should be turned on and/or if preventative action needs to be taken.

Some implementations of the current subject matter, describes a reconfiguration system that can reconfigure the data communication system. For example, the reconfiguration system can alter the architecture of the data communication (e.g., when a new data analytics needs to be added to an existing architecture). This can include, for example, routing the industrial data or a portion thereof to a new analytical model (e.g., that can perform new data analytics). In some implementations, an existing architecture of the data communication system can be reconfigured. For example, the criteria of dividing the industrial data into data subsets, routing the data subsets, etc., can be changed. In some implementations, a user can provide the reconfiguration instructions (e.g., configuration parameters) to the reconfiguration system that can reconfigure the data communication system (e.g., reconfigure the data segregator, data router, data aggregator, etc.) based on the reconfiguration instructions.

FIG. 1 is a flow chart of an exemplary method for configuring a data transmission system to transmit industrial data to one or more analytical models. At step 102, data characterizing a segregator code (e.g., a first segregator code), an aggregator code (e.g., a first aggregator code) and a plurality of configuration parameters associated with the data transmission system can be received. As discussed below, the segregator code and the aggregator code can include (or can be converted into) machine readable instructions that can be executed by a processor. The aggregator code and the segregator code can be modified based on one or more of the configuration parameters.

A reconfiguration system can receive one or more of the segregator code, the aggregator code and the plurality of configuration parameters from a user who wants to reconfigure the data transmission system. This can be done, for example, via an application programming interface (API) call (e.g., a first representational state transfer [REST] call) from a user to the reconfiguration system. In some implementations, if the segregator code (e.g., the first segregator code) and the aggregator code (e.g., the first aggregator code) have been previously provided, only the configuration parameters can be received by the reconfiguration system. The data transmission system can be configured to receive operation data characterizing an operation of an industrial system and transmit a portion of the operation data to an analytical model (e.g., the first analytical model).

FIG. 2 illustrates an exemplary framework of a data transmission system 200 that can be reconfigured by a reconfiguration system 250. The data transmission system 200 includes multiple data transmission routes (e.g., first data transmission route 210, second data transmission route 220, third data transmission route 230, etc.) for transmitting operation data received by the data transmission system 210. A data transmission route can include a segregator 202 a data router 204, a queue, and a data aggregator. For example, a first data transmission route 210 can include a first queue 212 and a first data aggregator 214; a second data transmission route 220 can include a second queue 222 and a second data aggregator 224; and a third data transmission route 230 can include a third queue 232 and a third data aggregator 234. A data transmission route can transmit a portion of the received operation data (e.g., operation data received at step 102) to an analytical model or a database (e.g., a database associated with the analytical model). For example, the first data transmission route 210 transmits data to a first analytical model 216; the second data transmission route 220 transmits data to a second analytical model 226; and the third data transmission route 230 transmits data to a third analytical model 226.

The segregator 202 can include a segregator code and the aggregators 214, 224 and 234 can include aggregator codes (e.g., different aggregators can include different aggregator codes). The segregator code and the aggregator code(s) can include machine-readable instructions that can be executed by at least one programmable processor. The reconfiguration system 250 can reconfigure the data communication system 200 (e.g., by modifying segregator/aggregator code(s), by adding new data transmission routes, etc.). The segregator 202 can receive operation data and generate a plurality of data subsets from the operation data. The segregator 202 can also assign an identifier to the data subsets that can determine the path of a data subset in the data transmission system 220 (e.g., determine the data transmission route of the data subset). The generation of data subsets and the assignment of identifiers can be achieved by the execution of the segregator code (e.g., by a processor). In some implementations, a data subset can travel through multiple data transmission routes. The data router 204 can direct a data subset to a data transmission route (or multiple data transmission routes).

Returning back to FIG. 1, at step 104, the first segregator code (associated with the segregator 202) and the first aggregator code (associated with the first aggregator 214) can be modified. In some implementations, the modifications can be based on one or more configuration parameters of the plurality of configuration parameters received at step 102. For example, the first segregator code can be configured to generate a plurality of data subsets from the received operation data. The size of the data subsets (e.g., maximum size) can be determined by the segregator code. For example, each data subset of the plurality of data subsets can be smaller than a first predetermined data size. The value of the first predetermined data size in the segregator code can be modified by the reconfiguration system 250 based on a first size configuration parameter in the configuration parameters received at step 102.

The first segregator code can be configured to assign identifiers to the various data subsets generated from the operation data (e.g., add an identifier to a data subset). For example, a first identifier can be assigned to a first set of data subsets of the plurality of data subsets. The first identifier can be indicative of the data transmission route of the first data subset in the data transmission system 200 (or the analytical model configured to receive the first set of data subset via the data transmission route). For example, the first identifier can be indicative of the first data transmission route 210/first analytical model 216. In some implementations, a data subset with a given identifier can travel to multiple analytical models or travel via multiple data transmission routes. As a result, an analytical model (e.g., first analytical model 216) can receive a portion of the operation data that includes data subsets having multiple identifiers (e.g., a first set of data subsets having the first identifier, a second set of data subsets having a second identifier, etc.). The identifiers in the segregation code can be modified (or new identifiers can be added, existing identifiers can be deleted, etc.) by the reconfiguration system 250 based on identifier configuration parameters (e.g., first identifier) in the configuration parameters received at step 102.

The data router 204 can receive the plurality of data subsets generated by the first segregator code, identify data subsets based on their identifiers and route the data subsets along the different data transmission routes based on their identifiers. For example, the data subsets having the first identifier can be routed along the first data transmission route 210, data subsets having a second identifier can be routed along the second data transmission route 220, data subsets having a third identifier can be routed along the third data transmission route 230, etc. A queue in a data transmission route (e.g., a first queue 212, a second queue 222 and a third queue 232 in the first data transmission route 210, the second data transmission route 220, and the third data transmission route 230, respectively) can receive a set of data subsets (e.g., first set of data subsets, a second set of data subsets, a third set of data subsets, respectively). The data subsets in a queue (or a portion of the data subsets) can be transmitted to a corresponding data aggregator in the data transmission route associated with the queue.

In some implementations, the data aggregator can identify if the queue has received new data subsets (e.g., by polling the queue to determine if new data subsets have been received by the queue), and send an instruction to transfer the entire set of data subsets (or a portion thereof) from the queue to the data aggregator. As discussed above, a data aggregator (e.g., first aggregator 214, the second aggregator 224, the third aggregator 234, etc.) can include an aggregator code that can include machine-readable instructions configured to be executed by at least one programmable processor. In some implementations, different aggregators (e.g., the first aggregator 214 and the second aggregator 224) can include different aggregator codes (e.g., first aggregator code and second aggregator codes, respectively).

An aggregator code (e.g., first aggregator code of the first aggregator 214) can be modified or configured by the reconfiguration system 250. In some implementations, the modifications can be based on one or more configuration parameters of the plurality of configuration parameters received at step 102. For example, an aggregator code (e.g., the first aggregator code) can be configured to identify that the corresponding queue (e.g., first queue 212) has received new data subsets (e.g., the first set of data subsets generated by the segregator 202 that has been transmitted via the first data transmission route 210). This can be done, for example, by polling the first queue 212. The aggregator code can be configured to combine two or more data subsets in the queue 212 (e.g., two or more data subsets of the first set of data subsets). This can be done based on a second predetermined data size associated with the first analytical model 216. For example, the first analytical model can configured to operate desirably (e.g., optimally) when it receives data subsets having the second predetermined size. The value of the second predetermined data size in the aggregator code can be modified by the reconfiguration system 250 based on a second size configuration parameter in the configuration parameters received at step 102.

Returning back to FIG. 1, at step 106, the segregator code (e.g., first segregator code) and the aggregator code (e.g., first aggregator code) can be deployed in the data transmission system (e.g., data transmission system 200). In some implementations, an aggregator/segregator code in an existing architecture of the data transmission system 200 can be replaced by the modified aggregator/segregator code generated by the reconfiguration system 250. In some implementations, the reconfiguration system 250 can create a new architecture of the data transmission system 200 (or alter an existing architecture). For example, the reconfiguration system can add a new data transmission route or remove an existing data transmission route in the data transmission system 200.

Adding a new data transmission route can include adding a new queue and that can receive data subsets from the data router 204 and a new aggregator communicatively coupled to the new queue. In some implementations, adding a new data transmission route can include adding a new segregator (not shown) that can include a copy of the first segregator code. This can be done, for example, to increase the data throughput of the data transmission system 210. For example, when operation data having a large data size is received by data transmission system 200, the reconfiguration system can make a determination that a new segregator is needed to process the operation data (e.g., in desirable time) and create a new data segregator with a copy of the first segregator code. A portion of the received operation data (e.g., a third portion) can be processed by the new data segregator (e.g., dividing the third portion of operation data into data subsets and assigning data identifiers to the data subsets). The data subsets generated by new segregator can be transmitted through the various data transmission routes based on their identifiers. For example, a third set of data subsets of the third portion of operation data having a first identifier can be transmitted to the first analytical model 216 via the first data transmission route 210.

In some implementations, the reconfiguration system 250 can be configured to receive a second aggregator code (at step 102 of FIG. 1). The second aggregator code (e.g., second aggregator code associated with the second aggregator 224) can be modified or configured by the reconfiguration system 250. In some implementations, the modifications can be based on one or more configuration parameters of the plurality of configuration parameters received at step 102. For example, the second aggregator code can be configured to identify that the second queue 222 has received new data subsets (e.g., a second set of data subsets generated by the segregator 202 that has been transmitted via the second transmission route 220). This can be done, for example, by polling the second queue 222. The second aggregator code can be configured to combine two or more data subsets in the second queue 222 (e.g., two or more data subsets of the second set of data subsets). This can be done based on a third predetermined data size associated with the second analytical model. The value of the third predetermined data size in the aggregator code can be modified by the reconfiguration system 250 based on a third size configuration parameter in the configuration parameters received at step 102.

The second aggregator code can be deployed in the second aggregator 224 (or a new aggregator added to the architecture of the data transmission system by the reconfiguration system 250). The second set of data subsets that are generated by and assigned a second identifier by the data segregator 202 can be transmitted over the second data transmission route 220 (which includes the data segregator 202, data router 204, second queue 222 and the second aggregator 224).

Figure 3:
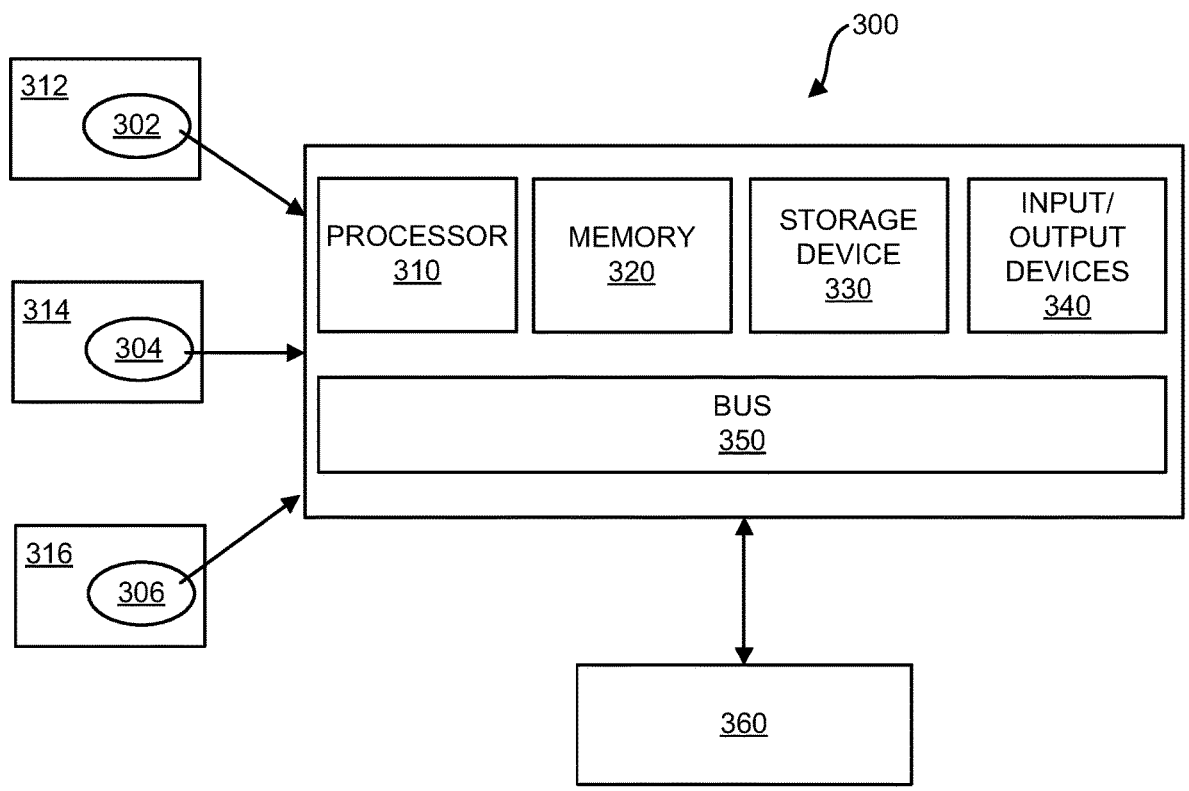
FIG. 3 illustrates an exemplary computing system configured to receive operation data from sensors coupled to industrial assets at an industrial site.

FIG. 3 illustrates an exemplary computing system 300 configured to receive operation data from sensors 302, 304 and 306 coupled to industrial assets 312, 314 and 316, respectively, that are located at an industrial site. The computing system 300 can include a processor 310, a memory 320, a storage device 330, and input/output devices 340. The processor 310, the memory 320, the storage device 330, and the input/output devices 340 can be interconnected via a system bus 350. The processor 310 is capable of processing instructions for execution within the computing system 300. Such executed instructions can implement one or more components of, for example, the data communication system, the reconfiguration system, and the like. In some example embodiments, the processor 310 can be a single-threaded processor. Alternately, the processor 310 can be a multi-threaded processor. The processor 310 is capable of processing instructions stored in the memory 320 and/or on the storage device 330 to display graphical information for a user interface provided via the input/output device 340.

The memory 320 is a computer readable medium such as volatile or non-volatile that stores information within the computing system 300. The memory 320 can store data structures representing configuration object databases, for example. The storage device 1330 is capable of providing persistent storage for the computing system 300. The storage device 330 can be a floppy disk device, a hard disk device, an optical disk device, a tape device, a solid state drive, and/or other suitable persistent storage means. The input/output device 340 provides input/output operations for the computing system 300. In some implementations, data characterizing the segregator code, the aggregator code, the plurality of configuration parameters, etc., can be received by the computing system 300 (e.g., from an user computing device 360). In some example embodiments, the input/output device 340 includes a keyboard and/or pointing device. In various implementations, the input/output device 1340 includes a display unit for displaying graphical user interfaces.

Other embodiments are within the scope and spirit of the disclosed subject matter. For example, the prioritization method described in this application can be used in facilities that have complex machines with multiple operational parameters that need to be altered to change the performance of the machines. Usage of the word "optimize"/"optimizing" in this application can imply "improve"/"improving."

Certain exemplary embodiments will now be described to provide an overall understanding of the principles of the structure, function, manufacture, and use of the systems, devices, and methods disclosed herein. One or more examples of these embodiments are illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a Read-Only Memory or a Random Access Memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web interface through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, may be applied to modify any quantitative representation that could permissibly vary without resulting in a change in the basic function to which it is related. Accordingly, a value modified by a term or terms, such as "about" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

What is claimed is:

1. A method comprising:
  receiving, by a reconfiguration system and from an industrial system, data characterizing a first segregator code of a first segregator, a first aggregator code of a first aggregator of a plurality of aggregators associated with a data transmission system, and a plurality of configuration parameters for reconfiguring components of the data transmission system, wherein the data transmission system comprises the first segregator, a data router, the plurality of aggregators and a plurality of analytic models that are reached using different data transmission routes and are configured to receive operation data characterizing an operation of the industrial system and transmits a portion of the operation data to a first analytical model of the plurality of analytical models by one of the different data transmission routes;
  modifying, by the reconfiguration system, the first segregator code and the first aggregator code based on one or more configuration parameters of the plurality of configuration parameters to adjust processing and data transmission routes of the operation data;
  deploying, by the reconfiguration system, the first segregator code to the first segregator and the first aggregator code to the first aggregator in the data transmission system, wherein the first segregator code is configured to assign a first identifier to a first portion of the operation data in order to provide the first portion of the operation data to the first analytical model, via a first data transmission route of a plurality of data transmission routes based on the first identifier, the first portion of the operation data being generated by dividing the operation data into a plurality of data subsets using the first segregator code, routing a first set of data subsets based on the assigned first identifier along a first data transmission route to combine a portion of the plurality of data subsets using the configured first aggregator and provide the combined portion of the plurality of data subsets to the first analytic model;
  receiving operation data characterizing an operation of the industrial system at the configured transmission system; and
  executing the first segregator code on the first segregator and the first aggregator code on the first aggregator to provide the first portion of the operation data to the first analytical model via the first data transmission route.

2. The method of claim 1, wherein modifying the first segregator code comprises configuring the first segregator code to:
generate a plurality of data subsets from the operation data, wherein each data subset of the plurality of data subsets is smaller than a first predetermined data size, and
assign a second identifier to a second set of data subsets of the plurality of data subsets, the second identifier indicative of a second analytical model configured to receive a second portion of the operation data that comprises the second set of data subsets, wherein the plurality of configuration parameters comprises the first predetermined data size and the second identifier.

3. The method of claim 2, further comprises:
receiving, by the data router, the plurality of data subsets generated by the first segregator code;
identifying, by the data router, the second set of data subsets based on the second identifier;
receiving, by a first queue, the second set of data subsets; and
transmitting at least a portion of the second set of data subsets to the first aggregator code, wherein the first data transmission route further comprises the data router and the first queue.

4. The method of claim 3, wherein modifying the first aggregator code comprises configuring the first aggregator code to:
identify that the first queue has received new data subsets; and
combine two or more data subsets of the second set of data subsets based on a second predetermined data size associated with the second analytical model, wherein the plurality of configuration parameters comprises the second predetermined data size.

5. The method of claim 2, wherein modifying the first segregator code further comprises configuring the first segregator code to:
assign a third identifier to a third set of data subsets of the plurality of data subsets, the third identifier indicative of a third analytical model configured to receive a third portion of the operation data that comprises the third set of data subsets, wherein the plurality of configuration parameters comprises the third identifier.

6. The method of claim 5, further comprises:
receiving a second aggregator code;
modifying the second aggregator code by at least configuring the second aggregator code to combine two or more data subsets of the third set of data subsets based on a third predetermined data size associated with the third analytical model, wherein the plurality of configuration parameters comprises the third predetermined data size;
deploying the second aggregator code in the data transmission system; and
providing the third portion of the operation data to the third analytical model via a second data transmission route that comprises the first segregator code and the second aggregator code.

7. The method of claim 1, further comprising:
deploying a second copy of the first segregator code; and
providing a fourth portion of the operation data to the first analytical model via a third data transmission route that comprises the second copy of the first segregator code and the first aggregator code.

8. The method of claim 1, wherein deploying the first segregator code and the first aggregator code comprises replacing an existing segregator code with the first segregator code and replacing an existing aggregator code with the first aggregator code.

9. The method of claim 1, wherein the first segregator code and the first aggregator code comprise machine-readable instructions configured to be executed by at least one programmable processor.

10. A system comprising:
at least one data processor;
memory coupled to the at least one data processor, the memory storing instructions to cause the at least one data processor to perform operations comprising:
receiving, by a reconfiguration system and from an industrial system, data characterizing a first segregator code of a first segregator, a first aggregator code of a first aggregator of a plurality of aggregators associated with a data transmission system, and a plurality of configuration parameters for reconfiguring components of the data transmission system, wherein the data transmission system comprises the first segregator, a data router, the plurality of aggregators and a plurality of analytic models that are reached using different data transmission routes and are configured to receive operation data characterizing an operation of the industrial system and transmits a portion of the operation data to a first analytical model of the plurality of analytic models by one of the different data transmission routes;
modifying, by the reconfiguration system, the first segregator code and the first aggregator code based on one or more configuration parameters of the plurality of configuration parameters to adjust processing and data transmission routes of the operation data;
deploying, by the reconfiguration system, the first segregator code to the first segregator and the first aggregator code to the first aggregator in the data transmission system, wherein the first segregator code is configured to assign a first identifier to a first portion of the operation data in order to provide the first portion of the operation data to the first analytical model, via a first data transmission route of a plurality of data transmission routes based on the first identifier, the first portion of the operation data being generated by dividing the operation data into a plurality of data subsets using the first segregator code, routing a first set of data subsets based on the assigned first identifier along a first data transmission route to combine a portion of the plurality of data subsets using the configured first aggregator and provide the combined portion of the plurality of data subsets to the first analytic model;
receiving operation data characterizing an operation of the industrial system at the configured transmission system; and
executing the first segregator code on the first segregator and the first aggregator code on the first aggregator to provide the first portion of the operation data to the first analytical model via the first data transmission route.

11. The system of claim 10, wherein modifying the first segregator code comprises configuring the first segregator code to:

generate a plurality of data subsets from the operation data, wherein each data subset of the plurality of data subsets is smaller than a first predetermined data size, and assign a second identifier to a second set of data subsets of the plurality of data subsets, the second identifier indicative of a second analytical model configured to receive a second portion of the operation data that comprises the second set of data subsets, wherein the plurality of configuration parameters comprises the first predetermined data size and the second identifier.

12. The system of claim 11, wherein the operations further comprise:

receiving, by the data router, the plurality of data subsets generated by the first segregator code;

identifying, by the data router, the second set of data subsets based on the second identifier;

receiving, by a first queue, the second set of data subsets; and transmitting at least a portion of the second set of data subsets to the first aggregator code, wherein the first data transmission route further comprises the data router and the first queue.

13. The system of claim 12, wherein modifying the first aggregator code comprises configuring the first aggregator code to:

identify that the first queue has received new data subsets; and combine two or more data subsets of the second set of data subsets based on a second predetermined data size associated with the second analytical model, wherein the plurality of configuration parameters comprises the second predetermined data size.

14. The system of claim 11, wherein modifying the first segregator code further comprises configuring the first segregator code to:

assign a third identifier to a third set of data subsets of the plurality of data subsets, the third identifier indicative of a third analytical model configured to receive a third portion of the operation data that comprises the third set of data subsets, wherein the plurality of configuration parameters comprises the third identifier.

15. The system of claim 14, wherein the operations further comprise:

receiving a second aggregator code;

modifying the second aggregator code by at least configuring the second aggregator code to combine two or more data subsets of the third set of data subsets based on a third predetermined data size associated with the third analytical model, wherein the plurality of configuration parameters comprises the third predetermined data size;

deploying the second aggregator code in the data transmission system; and providing the third portion of the operation data to the third analytical model via a second data transmission route that comprises the first segregator code and the second aggregator code.

16. The system of claim 10, wherein the operations further comprise:

deploying a second copy of the first segregator code; and providing a fourth portion of the operation data to the first analytical model via a third data transmission route that comprises the second copy of the first segregator code and the first aggregator code.

17. The system of claim 10, wherein deploying the first segregator code and the first aggregator code comprises replacing an existing segregator code with the first segregator code and replacing an existing aggregator code with the first aggregator code.

18. The system of claim 10, wherein the first segregator code and the first aggregator code comprise machine-readable instructions configured to be executed by at least one programmable processor.

19. A computer program product comprising a non-transitory machine-readable medium storing instructions that, when executed by at least one programmable processor that comprises at least one physical core and a plurality of logical cores, cause the at least one programmable processor to perform operations comprising:

receiving, by a reconfiguration system and from an industrial system, data characterizing a first segregator code of a first segregator, a first aggregator code of a first aggregator of a plurality of aggregators associated with a data transmission system, and a plurality of configuration parameters for reconfiguring components of the data transmission system, wherein the data transmission system comprises the first segregator, a data router, the plurality of aggregators and a plurality of analytic models that are reached using different data transmission routes and are configured to receive operation data characterizing an operation of the industrial system and transmits a portion of the operation data to a first analytical model of the plurality of analytic models by one of the different data transmission routes;

modifying, by the reconfiguration system, the first segregator code and the first aggregator code based on one or more configuration parameters of the plurality of configuration parameters to adjust processing and data transmission routes of the operation data;

deploying, by the reconfiguration system, the first segregator code to the first segregator and the first aggregator code to the first aggregator in the data transmission system, wherein the first segregator code is configured to assign a first identifier to a first portion of the operation data in order to provide the first portion of the operation data to the first analytical model, via a first data transmission route of a plurality of data transmission routes based on the first identifier, the first portion of the operation data being generated by dividing the operation data into a plurality of data subsets using the first segregator code, routing a first set of data subsets based on the assigned first identifier along a first data transmission route to combine a portion of the plurality of data subsets using the configured first aggregator and provide the combined portion of the plurality of data subsets to the first analytic model;

receiving operation data characterizing an operation of the industrial system at the configured transmission system; and executing the first segregator code on the first segregator and the first aggregator code on the first aggregator to provide the first portion of the operation data to the first analytical model via the first data transmission route that comprises the first segregator code.

20. The computer program product of claim 19, wherein modifying the first segregator code comprises configuring the first segregator code to:

generate a plurality of data subsets from the operation data, wherein each data subset of the plurality of data subsets is smaller than a first predetermined data size, and assign a second identifier to a second set of data subsets of the plurality of data subsets, the second identifier indicative of a second analytical model configured to receive a second portion of the operation data that comprises the second set of data subsets, wherein the plurality of configuration parameters comprises the first predetermined data size and the second identifier.

\* \* \* \* \*